United States Patent
Erkek et al.

(10) Patent No.: US 10,959,591 B2
(45) Date of Patent: Mar. 30, 2021

(54) SYSTEM COMPRISED OF A VEHICLE THAT MOVES INDEPENDENTLY WITHIN AN ENVIRONMENT AND A DOOR LOCATED IN THE ENVIRONMENT

(71) Applicant: Vorwerk & Co. Interholding GmbH, Wuppertal (DE)

(72) Inventors: David Erkek, Aarau (CH); Georg Hackert, Bochum (DE); Gerhard Isenberg, Cologne (DE); Roman Ortmann, Huerth (DE); Andreas Schmidt, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 292 days.

(21) Appl. No.: 16/004,646

(22) Filed: Jun. 11, 2018

(65) Prior Publication Data
US 2018/0353041 A1 Dec. 13, 2018

(30) Foreign Application Priority Data
Jun. 12, 2017 (DE) .................. 10 2017 112 839.5

(51) Int. Cl.
*A47L 9/28* (2006.01)
*A47L 11/24* (2006.01)
(Continued)

(52) U.S. Cl.
CPC ............. *A47L 11/24* (2013.01); *A47L 9/2815* (2013.01); *G05D 1/0022* (2013.01);
(Continued)

(58) Field of Classification Search
CPC .. G05D 1/0022; G05D 1/0274; G05D 1/0246; G05D 1/0234; G05D 2201/0203;
(Continued)

(56) References Cited

U.S. PATENT DOCUMENTS

| 7,912,633 B1* | 3/2011 | Dietsch | G05D 1/024 |
| | | | 701/450 |
| 2007/0112461 A1* | 5/2007 | Zini | G06K 7/0008 |
| | | | 700/245 |

(Continued)

FOREIGN PATENT DOCUMENTS

| CN | 204427945 U | 7/2015 |
| DE | 10 2011 050 357 A1 | 2/2012 |

OTHER PUBLICATIONS

Nishida; "Development of Intelligent Automatic Door System", Proceedings of the 2014 IEEE International Conference on Robotics and Automation, pp. 6368-6374, 2014 (Year: 2014).*

*Primary Examiner* — Stephen Holwerda
(74) *Attorney, Agent, or Firm* — Collard & Roe, P.C.

(57) ABSTRACT

A system consists of a vehicle in the form of an independently moving vehicle in the form of a cleaning robot, and a door with a doorframe and a door leaf. The vehicle has a detector for detecting object data within the environment. In order to be able to open a door without the cleaning robot manually acting on the door, the door has an electronic actuator for changing an open state of the door, and the vehicle has or is allocated a controller, which is set up to output a control command for activating the actuator depending on an operating state and/or position of the vehicle.

9 Claims, 5 Drawing Sheets

(51) Int. Cl.
*G05D 1/00* (2006.01)
*G05D 1/02* (2020.01)
*A47L 11/40* (2006.01)

(52) U.S. Cl.
CPC ......... *G05D 1/0234* (2013.01); *G05D 1/0246* (2013.01); *G05D 1/0274* (2013.01); *A47L 11/4094* (2013.01); *A47L 2201/04* (2013.01); *G05D 2201/0203* (2013.01); *G05D 2201/0215* (2013.01)

(58) Field of Classification Search
CPC ........... G05D 2201/0215; A47L 9/2815; A47L 11/24; A47L 2201/04; A47L 11/4094
See application file for complete search history.

(56) References Cited

U.S. PATENT DOCUMENTS

| | | | | |
|---|---|---|---|---|
| 2012/0165984 | A1* | 6/2012 | Kang | ......................... B25J 5/00 700/259 |
| 2012/0223808 | A1* | 9/2012 | Friedli | ..................... G07C 9/27 340/5.6 |
| 2013/0206177 | A1* | 8/2013 | Burlutskiy | ........... G05D 1/0219 134/18 |
| 2014/0039676 | A1* | 2/2014 | Fernando | ............... G05D 1/024 700/253 |

* cited by examiner

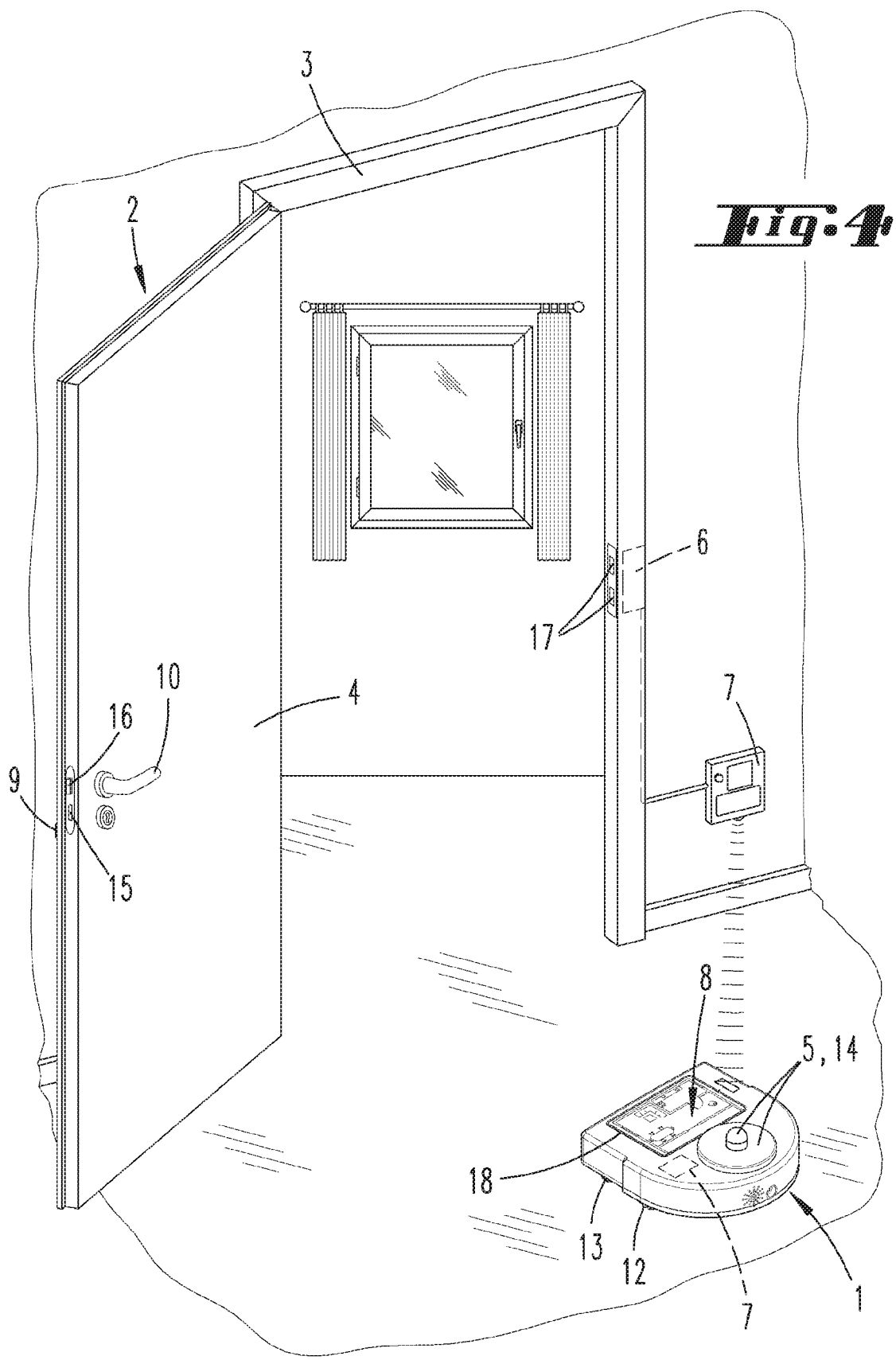

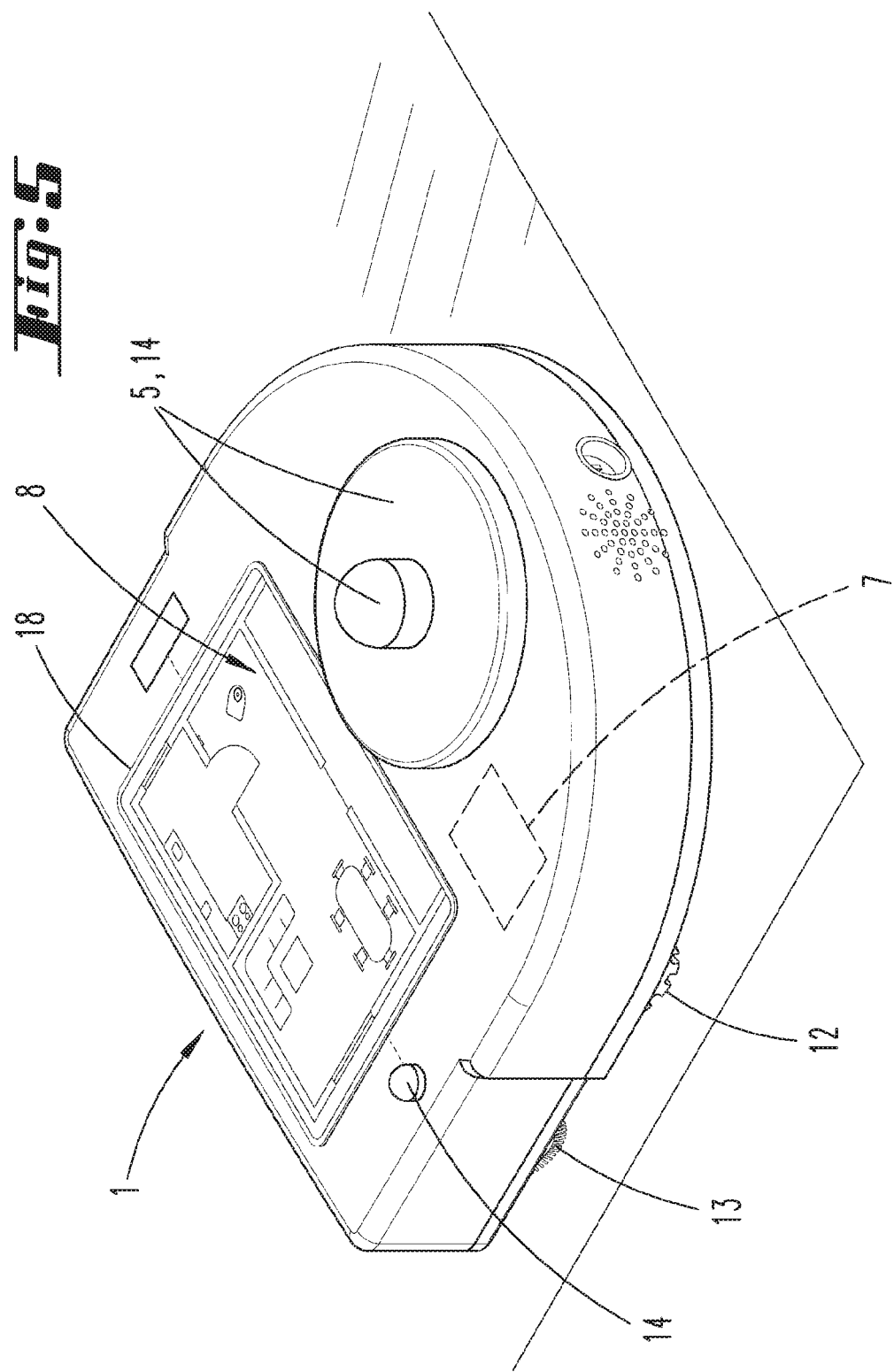

SYSTEM COMPRISED OF A VEHICLE THAT MOVES INDEPENDENTLY WITHIN AN ENVIRONMENT AND A DOOR LOCATED IN THE ENVIRONMENT

CROSS REFERENCE TO RELATED APPLICATIONS

Applicant claims priority under 35 U.S.C. § 119 of German Application No. 10 2017 112 839.5 filed Jun. 12, 2017, the disclosure of which is incorporated by reference.

BACKGROUND OF THE INVENTION

1. Field of the Invention

The invention relates to a system comprised of an unmanned vehicle that moves independently within an environment, in particular a cleaning robot, and a door located within the environment having a doorframe and a door leaf, wherein the vehicle has a detector for detecting object data within the environment.

The invention further relates to a method for operating a system comprised of an unmanned vehicle that moves independently within an environment, and a door located within the environment having a doorframe and a door leaf, wherein a detector of the vehicle records object data within the environment.

2. Description of the Related Art

Unmanned vehicles moving independently within an environment are sufficiently known in prior art. For example, the vehicle can be any type of floor processing robot, for example a vacuuming robot, a wiping robot, a grinding and/or polishing robot or the like. In addition, the vehicle can also be a vehicle that performs no processing task, but rather a transport task.

Vehicles of the aforementioned kind usually have a detector for detecting object data within the environment. As a result, the vehicle can orient itself within the environment and prevent a collision with obstacles.

In particular as the vehicle independently moves within a home comprised of several rooms, it can happen that the vehicle stands in front of a door that is closed or not opened wide enough while moving from one room to an adjacent room. For this reason, means were developed in prior art to allow at least those doors to be opened whose door leaves have only been left ajar, but have not been locked with the doorframe or can otherwise only be separated by actuating a door handle.

For example, publication DE 10 2011 050 357 A1 discloses a system comprised of a vehicle and a door, whose door leaf is in an open position relative to a corresponding doorframe, such that a free passage is inadequate for the vehicle to travel through. It discloses that the vehicle hits the door leaf to open it further, or the vehicle establishes a suction coupling with the door leaf, and travels backward to further open the door.

Also known for example from CN 204427945 U is a vehicle that has a gripper with an activation element, which at a unit height of the vehicle can act on a corresponding mechanism of a door, and thereby also activate a door handle or door latch and/or a deadbolt.

Even though the aforementioned prior art has useful partial solutions for changing the open state of a door, they require that the vehicle mechanically act on the door, which necessitates special fixtures on the vehicle.

SUMMARY OF THE INVENTION

Therefore, proceeding from the aforementioned prior art, it is the object of the invention to provide a system of the aforementioned kind that allows a vehicle to change an open state of the door without contact.

In order to achieve the aforementioned object, it is proposed that the door have an electronic actuator for changing an open state of the door, and that the vehicle have a controller and/or that a controller be allocated to the vehicle, which is set up to output a control command for activating the actuator depending on an operating state and/or position of the vehicle.

According to the invention, the vehicle is now designed to act on the door via an electronic control command and initiate a change in an open state of the door. To this end, the controller is designed to transmit a control command to the electronic actuator of the door, wherein this control command contains a command for opening or closing the door. The control command can preferably already be transmitted from a distance at which the vehicle is not within the swivel range of the door. This eliminates the need for the vehicle to drive up to the door, so that there is no resultant limitation on the movement of the vehicle and/or door. The controller thus serves as a remote control for the actuator of the door, so that the vehicle moving through several rooms of a home can itself act on the doors so as to continue its traveling route without any obstacles, for example. The controller can either be a controller integrated into the vehicle or an external controller, in particular a central controller of the system. In both cases, the controller is designed to generate and/or transmit a control command as a function of an operating state and/or a position of the vehicle. For example, the operating state of the vehicle can be an active state during a cleaning operation, during a monitoring patrol, during a regeneration and/or battery charging operation or the like. The position of the vehicle can be a distance to a door, a stay at a base station, a position along a planned travel path or the like. In the event the controller is an external controller relative to the vehicle, the controller can either generate the control command itself as a function of a state and/or position of the vehicle, or receive a control command from the vehicle and relay it unchanged and/or modified to the actuator of the door.

In particular, it is proposed that the vehicle have a calculating means for generating an area map based on the detected object data, wherein the area map or a file linked with the area map has information about a spatial position of a door within the environment. For example, the area map can be stored in a data memory of the vehicle and/or a data memory of the system, and contain positions of objects, spatial boundaries, doors, vehicles and the like. The vehicle uses the area map for navigation and self-localization, while the controller is used to generate a control command. For example, it can be provided that a calculating means of the vehicle execute a SLAM algorithm, so as to build up or modify the area map and localize itself within the environment. The area map advantageously also contains information about a spatial position of the door within the environment, wherein the position of the door is advantageously stored on the one hand, but so too is information on the other, e.g., about the width of the door, a swiveling direction of the door leaf and possibly a depth of the doorframe, which often essentially corresponds to the thickness of a room wall.

It is not required that information about the door be stored in the area map itself. Rather, an item or items of information can also be stored in a separate file, which has a link to the area map. For example, it is conceivable that only the spatial position of the door be stored in the area map, while additional information, for example about its swiveling direction and passage width, are stored in a separate file, which the calculating means can access when additional information about this door is needed.

It is proposed that the controller be set up to automatically generate a control command once it has been detected that a moving route of the vehicle involves a door. In this embodiment, the system is designed in such a way that those doors in the environment through which a moving route of the vehicle leads automatically be opened beforehand, so that the movement of the vehicle is not delayed because it must wait for a door leaf to swivel. In addition, several separate control commands need not be generated during the vehicle movement. A single control command containing opening commands for several doors can be generated instead, for example at the beginning of a planned moving route. If this vehicle crosses the door again in the opposite direction after performing the respective task, another control command containing a closing command can be transmitted to the door. As a result, a door that had been closed before the vehicle started moving can be closed once again. As an alternative, the door can also be closed by having the vehicle push the door leaf back toward the doorframe again. However, the process of closing the door is especially preferably also completely automatic. For example, the controller can use the current position of the vehicle on the area map to determine whether a room last traversed has again been exited. In this case, the actuator of the door can be controlled in such a way that a defined state is assumed, for example a closed position of the door. In particular, this can be advantageous when people are in the room who are not to be disturbed. It is also conceivable that it be stipulated in the area map or in conjunction with the moving route which doors in a home must not be opened or can only be opened at specific times, for example so as to prevent a person in a specific room from being disturbed.

An advantageous embodiment proposes that the controller be a central controller, in particular a central controller of a home automation network. In this embodiment, the system comprised of at least one vehicle and a door is part of a home automation network, in which a plurality of devices in the household communicate with each other. Communication takes place via the central controller, for example which can be an access point of a WLAN network. It is possible that the central controller be designed as a separate device. In addition, however, a controller of a vehicle can also take over the function of the central controller. The doors of the system or home automation network can be controlled by means of the central controller. In this conjunction, the central controller can also access a memory of the home automation network, which stores information not just about the accompanying vehicles and doors, but also about other devices or systems in the home automation network, for example audio and/or video systems, shutters, lights, air conditioners, kitchen appliances, other household appliances, heaters and the like. All information of the home automation network can be integrated into the area map of the vehicle or be linked with the area map.

It is further proposed that the vehicle and/or controller have a registration system for manually registering the door by a user and/or automatically registering the door. For example, the vehicle or a central controller of the system can have a manual input interface, for example a keyboard or touchscreen, which a user can use to manually register a door. For registration purposes, he or she enters a type and position of the door in the vehicle or separate controller, for example. In turn, the information can then be incorporated into an area map or be linked with the latter. However, the vehicle or controller can additionally have a registration system for automatically registering a door. In this case, the registration system can be a sensor, for example, which detects information about the door. For registration purposes, for example, the vehicle can actuate each door and measure its position, determine an opening direction of the door, etc.

In particular, it is proposed that the vehicle and/or controller have an acquisition means for detecting and/or identifying a door and/or detecting an open state of the door. In particular, the acquisition means can be an image acquisition device and/or a reader for an optical and/or electronic code of the door. The acquisition means is a sensor of the vehicle or a controller of the system, which can determine a spatial position of the door and/or potentially other information, for example its type, dimensions, opening direction and the like. Furthermore, the acquisition means is advantageously suitable for detecting whether the door is currently in an open or closed state. Even partially open doors can be detected, for example an intermediate state of a swiveling door or a sliding door. In particular, the acquisition means can be an image acquisition device like a camera or a camera chip and/or a reader, which is suitable for reading an optical or electric code of the door. In particular, the code can be a barcode, QR code, a light signal, an RFID chip or the like. Detection within the environment of present doors along with additional information can preferably take place during a learning run of the vehicle, whereupon the gathered information is stored in the area map or linked with the latter. The acquisition means is thus used to register the respective door of the system. The vehicle can approach any door, identify it based on an optical and/or electric code, and determine a spatial position of the door within the environment. In addition, the code of the door can also contain information about what technology can be used to open the respective door. As an alternative, however, such information can also be transmitted by a user via a user interface, for example, in particular a mobile device. The recorded information about one or several doors can then be transmitted to a central controller of the system. The central controller then has all of the information about the doors within the system. If an additional or new vehicle is then reported to the system, it can link itself with the central controller and access all information about the present doors with an automatic actuation option. The information of the central controller can be incorporated into the area map of the vehicle or be linked with the latter. For example, the information can here be read from the central controller into the area map or a memory of the vehicle in such a way that the vehicle is in a base station, e.g., in order to charge the battery. The base station and central controller can have a hardwired communication channel, for example via PowerLAN.

It is proposed that the actuator of the door have an electromagnet, a spring mechanism and/or an electric motor. As a consequence, the doors can be automatically opened using different technologies. For example, the actuator can have an electromagnet, which advantageously is integrated into the doorframe. The door leaf can have a corresponding metal plate. The energized state of the electromagnet can here either correspond to a preferred position of the door or not, depending on whether a closed door or an open door is desired for the respective room. The actuator can have allocated to it a spring mechanism, which displaces the door leaf relative to the doorframe. The spring mechanism can be configured in such a way as to leave open at least enough of a passage area through which the vehicle can be maneuvered without any collision. As an alternative, it can also be provided that the electromagnet only activate a bolt and/or latch of a door lock, and the spring mechanism only slightly displace the door leaf, for example by a few centimeter, so that the vehicle must still displace the door leaf further, in particular by shifting it. In particular, the door can also be equipped with an electric door opener, for example a self-sustaining door buzzer. An electric motor can also be used to displace the door leaf relative to the doorframe.

It is proposed that the vehicle and/or actuator of the door and/or central controller have a communication module, in particular a radio module. Communication between the system components, specifically one or several vehicles, one or several actuators and/or a central controller, can advantageously take place through wireless communication, for example via WLAN, Bluetooth, optical communication or the like. In addition, for example, communication between the central controller of the system and an actuator of a door (doorframe) can be hardwired. For example, hardwired communication can take place via PowerLAN.

Apart from the described system, the invention also proposes a method for operating a system comprised of an unmanned vehicle moving independently within an environment and a door located in the environment with a doorframe and door leaf, wherein a detector in the vehicle records object data within the environment, wherein a controller of the vehicle or a controller of the system outputs a control command for activating an electronic actuator of the door depending on an operating state and/or a position of the vehicle, wherein the electronic actuator receives the control command and thereupon changes an open state of the door. The advantages and features of the method are as explained in greater detail above in relation to the system. In particular, the vehicle now no longer has to manually act on a door leaf to displace it relative to the doorframe. Rather, it is now possible to open the door from a greater distance, specifically by way of a control command that activates an actuator of the door, which finally brings about a specific open state of the door. As explained above, the control command can be transmitted from the vehicle to the actuator of the door either directly or via a separate, central controller of the system. Communication is here advantageously made possible through wireless radio communication or also optical communication.

In particular, it can be provided that a calculating means of the vehicle generate an area map based on the detected object data, wherein information about a spatial position of a door within the environment is stored in the area map or in a file linked with the area map. The vehicle thus detects the positions and possibly additional information for the doors present in the environment. This information is stored in the area map or linked thereto. As an alternative, a separate controller of the system could also generate a corresponding area map and possibly transmit it to the vehicle.

In addition, it can be provided that the controller of the vehicle or a separate controller of the system automatically generate a control command once it has been detected that a moving route of the vehicle includes a door. In this procedure, a door is opened not just when it becomes necessary to do so, for example because the vehicle is currently traveling toward the door. One or several doors can instead be opened in advance, before the movement starts. This enables an especially easy and expeditious movement of the vehicle within the environment.

It is further proposed that a door be registered to the system manually by a user, or by means of a registration device of the vehicle and/or the controller. In particular, a door can be registered automatically. For registration purposes, an acquisition means of the vehicle and/or controller can detect and/or identify a door within the environment. In addition, the method can involve detecting an open state of the door. The door is advantageously detected or identified by an image acquisition device and/or a reader, which is designed to detect an optical and/or electromagnetic code of the door.

The open state of the door can advantageously be modified by an electromagnet and/or a spring mechanism and/or an electric motor, which is allocated to the door. In particular, use can also be made of known electric door openers, for example self-sustaining door buzzers.

BRIEF DESCRIPTION OF THE DRAWINGS

The invention will be explained in more detail below based on exemplary embodiments. In the drawings.

DETAILED DESCRIPTION OF THE PREFERRED EMBODIMENTS

Figure 1:
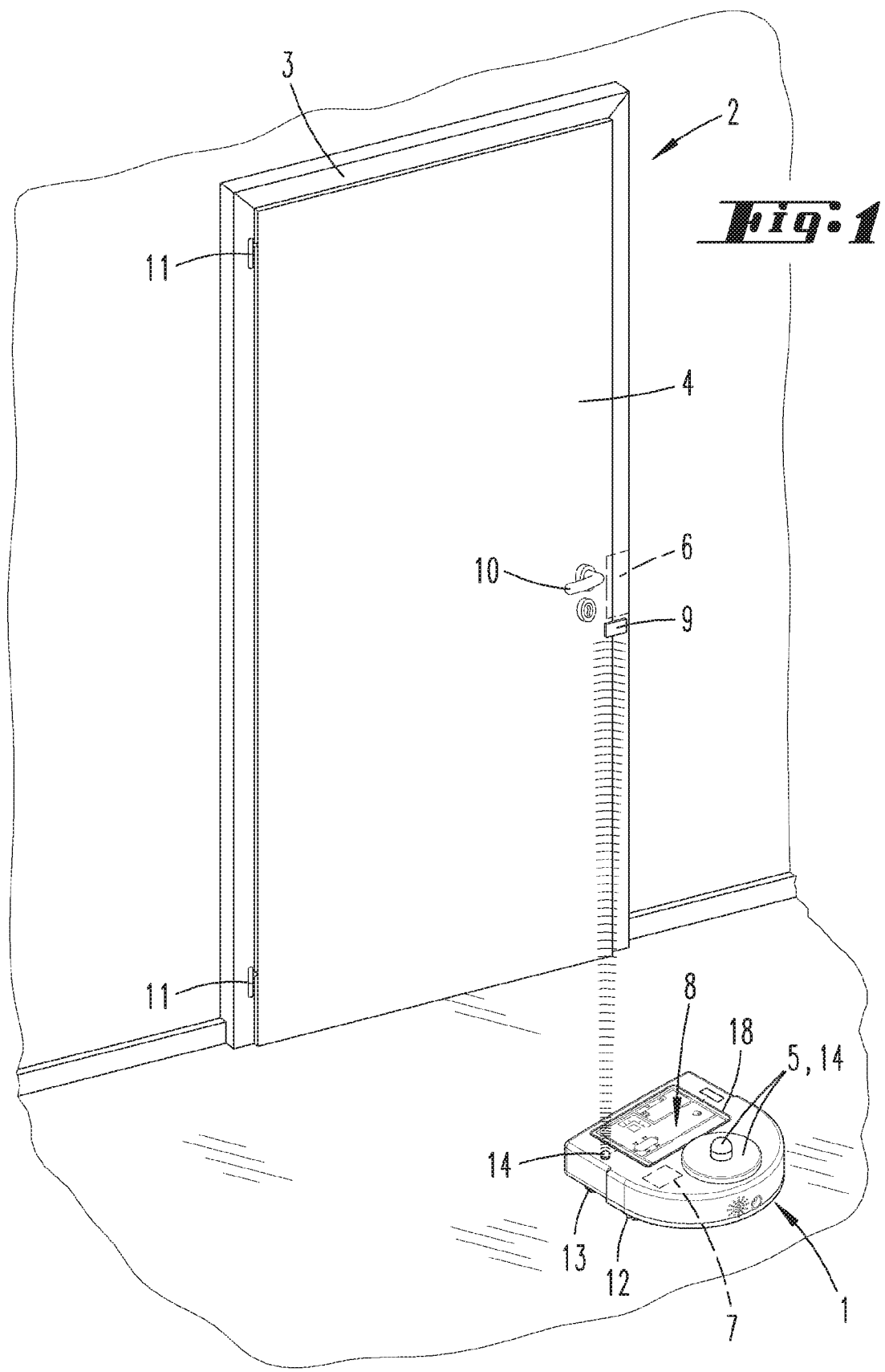
FIG. 1 is a registration situation of an automatically opening door on a vehicle.

FIG. 1 shows a system comprised of a vehicle 1 and a door 2. The door 2 has a doorframe 3, a door leaf 4, a door handle 10 and two door hinges 11, as commonly the case. In addition, the door 2 has an electronic actuator 6 for changing an open state of the door 2. For example, the actuator 6 here has an electric motor for displacing a bolt 15 and a door latch 16 of the door leaf 4. The door hinges 11 each have allocated to them a spring mechanism (not shown), which when the door latch 16 or bolt 15 is released, causes the door leaf 4 to automatically swivel relative to the doorframe 3, specifically to an extent that the vehicle 1 can travel between the doorframe 3 and door leaf 4 into an adjacent room.

Not depicted in any more detail on FIG. 5, the vehicle 1 is here an independently moving vacuuming robot with several motor-driven wheels 12 and a cleaning element 13, here a bristle roller. The vehicle 1 has detectors 5, here specifically a triangulation measuring device for measuring distances to objects in the environment, as well as an image acquisition device, which can record an image of the environment of the vehicle 1. The detectors 5 are advantageously designed to measure in a 360 degree angular range. In addition, the vehicle 1 has a calculating means (not depicted) allocated to a controller 7, which is set up to generate an area map 8 from the data measured by the detectors 5. The area map 8 contains objects in the environment, for example also doors 2 and their current open state. The controller 7 is designed to use the area map 8 to determine a traveling route for the vehicle 1, preferably one that avoids a collision with objects or doors 2. The vehicle 1 also has acquisition means 14, which are set up and designed to read out an identification means 9 of a door 2. For example, the identification means 9 can be an RFID tag, which provides an identification for the door 2. The acquisition means 14 is here an RFID reader, for example, which in conjunction with the calculating means of the vehicle 1 is suitable based on the RFID code to determine the identity of the door 2 and receive information about the door 2, for example information that an automatically opening door 2 is involved, what technology the door 2 has for automatically opening, and what communication protocol is to be used. In addition, the detector 5 designed as an image acquisition device is also an acquisition means 14, which can be used to read a barcode, QR code or the like, for example.

FIG. 1 represents the process for registering the door 2 to the vehicle 1. For example, this registration process can take place during a learning run of the vehicle 1. The acquisition means 14, here the RFID reader of the vehicle 1, is active and sends out an excitation signal, to which the identification means 9 of the door 2, specifically the RFID tags, respond with a signal containing information about the actuator 6 of the door 2. The signal sent back by the identification means 9 provides the vehicle 1 or its controller 7 with information about the identity and features of the door 2 or its actuator 6. The controller 7 of the vehicle 1 or its calculating means can store and/or process these data, for example file them in the area map 8.

Such a registration process can take place in a plurality of doors 2, which are located within the environment of the vehicle 1. The vehicle 1 can sequentially approach each of these doors 2 and read out their identification means 9, and also determine their position and if need be dimension within the environment.

Even though not shown, a door 2 could of course also be detected by the detector 5, specifically the image acquisition device, of the vehicle 1. In addition, other identification means 9 can be read out, for example barcodes, QR codes, iBeacons and the like.

Figure 2:
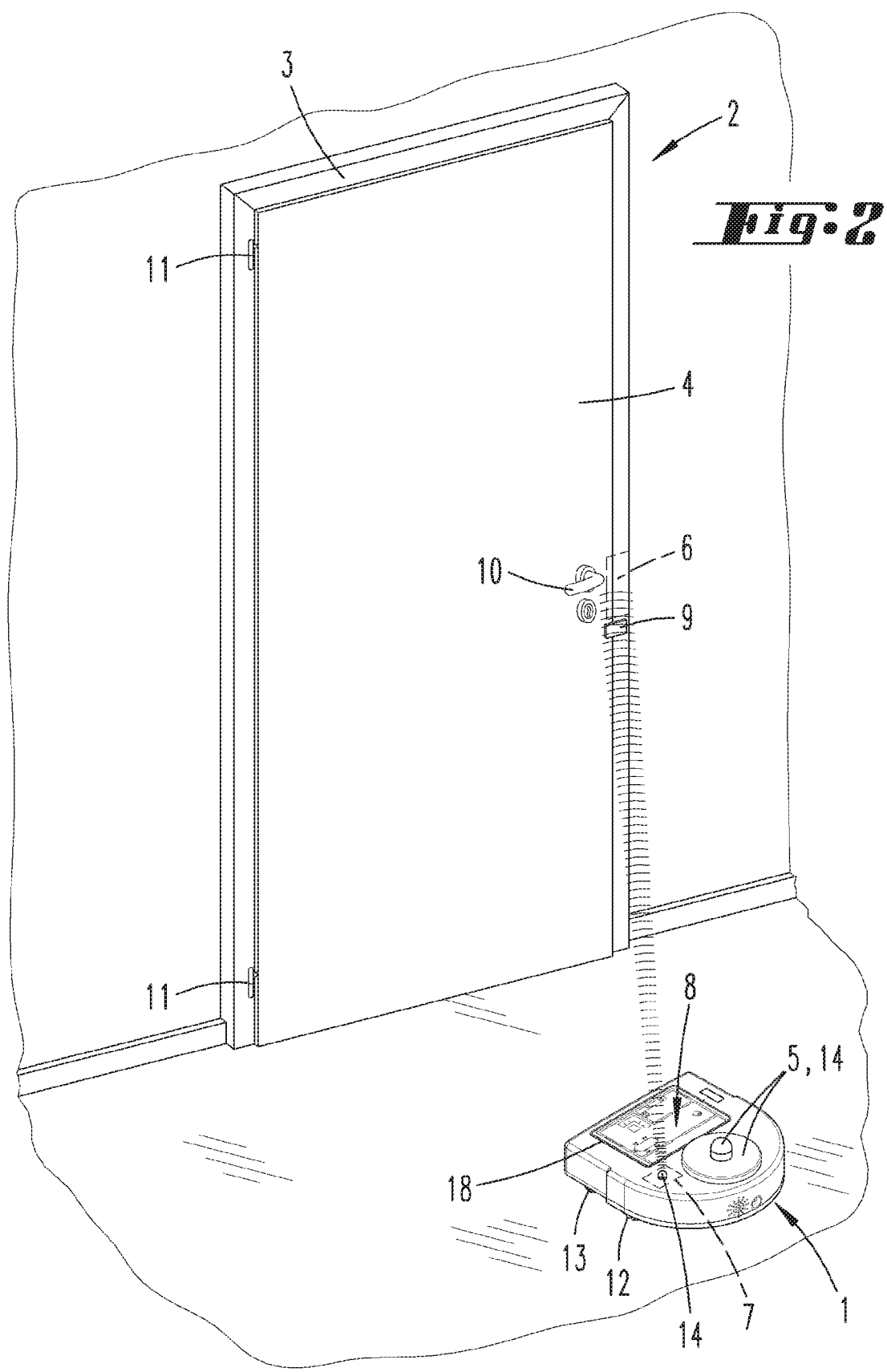
FIG. 2 is the transmission of a control command for opening the door from the vehicle to an actuator of the door.

FIG. 2 shows a situation after the door 2 has been completely registered. The vehicle 1 moves along a moving route through the home. The closed door 2 depicted on the figure is located in the moving route of the vehicle 1. In order to be able to continue on the moving route, the controller 7 of the vehicle 1 checks the features stored in the area map 8, and identifies the door 2 based on the identification means 9 and/or its current own position. The information stored in the area map 8 further tells the controller 7 what communication protocol to use for transmitting a control command to the actuator 6 of this door 2. For example, the information filed in the area map 8 here indicates that the actuator 6 has a WLAN communication module. The vehicle 1 then transmits a control command to the actuator 6 with a corresponding WLAN communication module. The control command is a command to open the door 2, i.e., to swivel the door leaf 4 relative to the doorframe 3. The actuator 6, which here has an electric motor, thereupon activates the door latch 16 and bolt 15 of the door leaf 4 in such a way that the latter no longer engage into corresponding recesses 17 (see FIG. 4) in the doorframe 3. The restoring force of the spring mechanism allocated to the door hinges 11 causes the door 2 to swing open, so that the vehicle 1 can get into the adjacent room.

After the vehicle 1 has left the adjacent room again, it can be provided that the vehicle 1 close the door 2 once more, by virtue of the vehicle 1 driving against the door leaf 4 and displacing it against the restoring force of the spring mechanism toward the doorframe 3 until the door latch 16 finally engages again.

Figure 3:
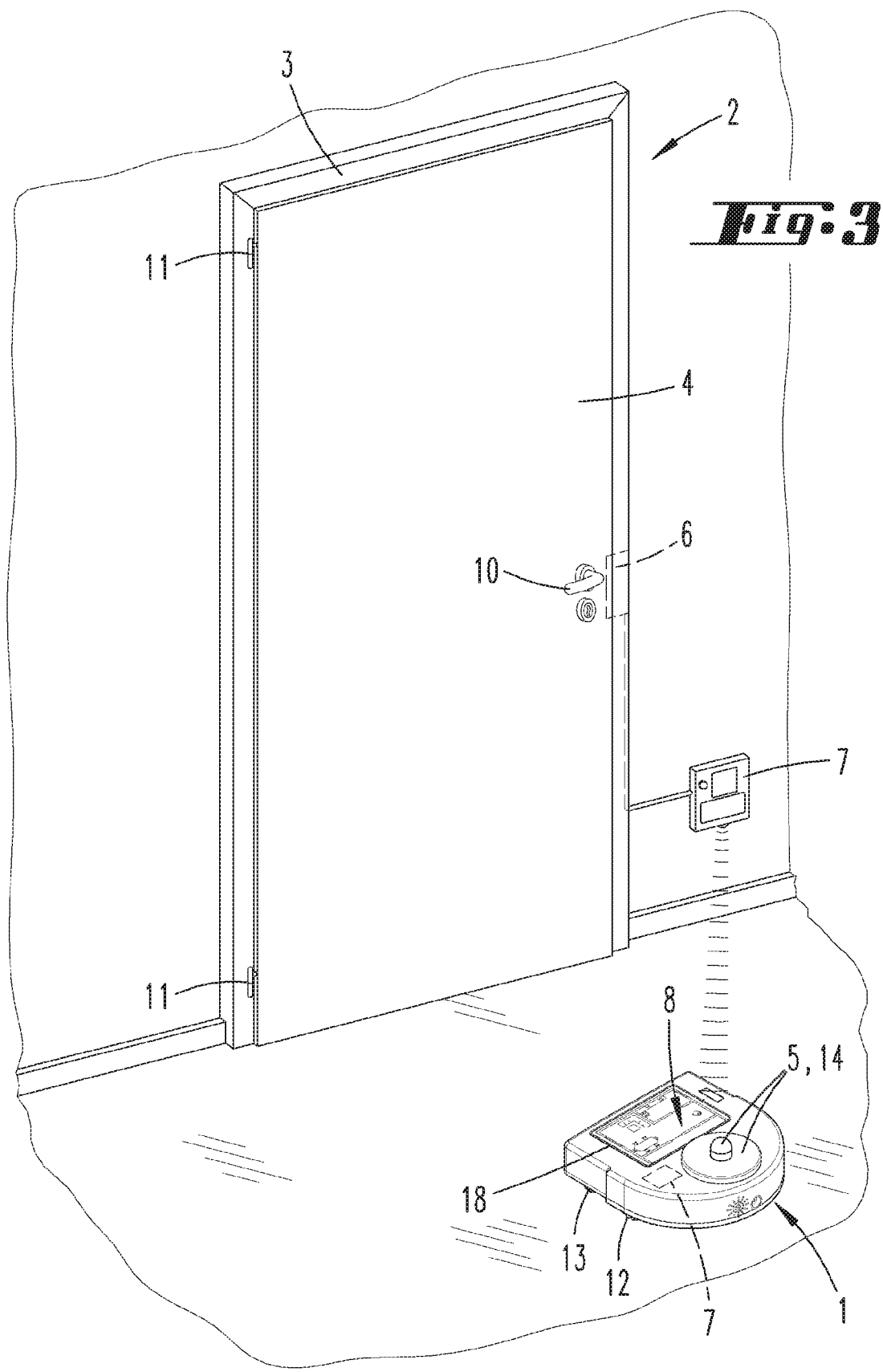
FIG. 3 is the transmission of a control command from a vehicle to a central controller, which is connected with an actuator of the door, FIG. 4 the vehicle and the door according to FIG. 3 at a time after opening the door, FIG. 5 the vehicle with area map stored therein.

FIGS. 3 and 4 show another embodiment of the invention in which the vehicle 1 and door 2 are part of a home automation system with a separate, central controller 7. In this embodiment, the vehicle 1 and door 2 communicate with each other via the separate controller 7. If necessary, additional vehicles 1 and/or doors 2 or even entirely different devices, such as shutters, air conditioners, lights and the like, can be interconnected within the home automation network and receive control commands via the central controller 7.

According to this embodiment, both the doors 2 and vehicles 1 are registered to the central controller 7. The door 2 can here be registered as explained previously in relation to FIG. 1, only that the door 2 is now registered with the separate controller 7, and not with the vehicle 1. For this purpose, a system user can employ an external terminal, for example a mobile phone, a laptop or the like, to transmit information about the door 2 and its actuator 6 to the controller 7. The vehicle 1 also registers itself with the central controller 7. The information received by the central controller 7 about the doors 2 and potentially other vehicles 1 is preferably also transmitted to the vehicle 1 and integrated into its area map 8 or linked with the latter.

For example, communication between the vehicle 1 and central controller 7 of the system here takes place via WLAN. Communication between the central controller 7 and actuator 6 of the door 2 takes place via a hardwired communication channel, here for example by means of PowerLAN.

In the invention according to this embodiment, the controller 7 of the vehicle 1 can now plan a moving route through the environment in which the door 2 is also located. The vehicle 1 transmits its planned moving route via WLAN to the central controller 7. The central controller 7 thereupon checks what doors 2 are situated on the planned moving route. The central controller 7 can here access either the area map 8 of the vehicle 1 via WLAN, or its own area map. As soon as the doors 2 located on the moving route have been identified, the central controller 7 transmits a control command to each of these doors 2 or their actuators 6. The control command has an instruction to displace the door leaf 4 relative to the doorframe 3 to such an extent that the vehicle 1 can continue its moving route through the open door 2 without any collisions. The actuator 6 can transmit its open status back to the central controller 7, which thereupon adjusts the area map 8 or relays the open status to the vehicle 1.

FIG. 4 shows the open state of the door 2, in which the door leaf 4 is swiveled so far away from the doorframe 3 that the vehicle 1 can pass through the door opening without any problems.

Finally, FIG. 5 presents a magnified view of the vehicle 1. The vehicle 1 is here designed as an autonomous cleaning robot. The vehicle has a cleaning element 13, here specifically an electric motor-driven bristle roller. In addition, the vehicle 1 has wheels 12 for autonomous movement within the environment. Electrical power is supplied to the vehicle 1 by a battery (not shown). Further visible are the detectors 5, specifically here a 360 degree triangulation measuring device along with an image acquisition device, specifically a camera. The latter are each not described in any greater detail here, but can rather be derived from prior art. In addition, the camera also functions as an acquisition means 14 for acquiring an identification means 9 of a door 2. The vehicle 1 further has a separate acquisition means 14, which is here an RFID reader, for example. The area map 8 of the environment of the vehicle 1 is stored in a memory (not shown). As depicted on a display 18 of the vehicle 1, the latter has a floor plan of the home with objects contained therein, here specifically furniture and spatial boundaries. In addition, the area map 8 has the doors 2, which were previously registered by the vehicle 1 or controller 7 of the system. The respective swiveling range of the door leaf 4 of the door 2 is also filed in the area map 8.

The area map 8 can also be linked with a memory having additional information about the doors 2. The information can involve information to the effect that specific doors 2 can basically not be opened or only opened within specific time ranges, for example so as not to disturb the user in a specific room.

REFERENCE LIST

1 Vehicle
2 Door
3 Doorframe
4 Door leaf
5 Detector
6 Actuator
7 Controller
8 Area map
9 Identification means
10 Door handle
11 Door hinge
12 Wheel
13 Cleaning element
14 Acquisition means
15 Bolt
16 Door latch
17 Recess
18 Display

What is claimed is:

1. A system comprising:
    an unmanned vehicle that moves independently within an environment, and having a detector for detecting object data within the environment,
    a controller connected to or allocated to the vehicle, and
    a door located in the environment with a doorframe and a door leaf, the door having an electronic actuator for changing an open state of the door,
    wherein the controller is configured to output a control command for activating the actuator depending on an operating state and a position of the vehicle,
    wherein the position of the vehicle that generates the control command is a defined distance to the door and/or a defined position along a planned moving route,
    wherein the door has an identification means comprising an optical and/or electronic code,
    wherein the vehicle has an acquisition device for identifying the door, the acquisition device being a reader for the optical and/or electronic code of the door, and wherein the controller is set to submit a control command to the actuator of the detected or identified door,
    wherein the controller is configured to automatically generate the control command once the detector detects that a moving route of the vehicle involves the door,
    wherein the controller is configured to automatically open beforehand the door through which the planned moving route of the vehicle leads, so that the movement of the vehicle is not delayed because vehicle must wait for the door leaf to swivel, and
    wherein the controller is configured to access an area map, identify therein all the doors located on the moving route and transmit a control command for activating the actuator to each of the doors before the movement along the moving route starts.

2. The system according to claim 1, wherein the vehicle has a calculator for generating an area map based on the detected object data, wherein the area map or a file linked with the area map has information about a spatial position of a door within the environment.

3. The system according to claim 1, wherein the controller is a central controller of a home automation network.

4. The system according to claim 1, wherein the vehicle and/or controller has a registration system for registering the door automatically or manually.

5. The system according to claim 1, wherein the actuator of the door has at least one of an electromagnet, a spring mechanism and an electric motor.

6. The system according to claim 3, further comprising a communication module connected to at least one of the vehicle, the actuator of the door or the central controller.

7. The system according to claim 6, wherein the communication module is a radio module.

8. A method for operating a system comprised of an unmanned vehicle that moves independently within an environment, a controller connected to or allocated to the vehicle, and a door located in the environment with a doorframe and a door leaf, comprising the following steps:
    recording object data within the environment with a detector of the vehicle,
    identifying the door with an acquisition device, wherein the acquisition device is a reader that identifies an optical and/or electronic code of an identification means of the door,
    outputting with the controller a control command for activating an electronic actuator of the door depending on an operating state and a position of the vehicle, wherein the position of the vehicle that generates the control command is a defined distance to the door and/or a defined position along a planned moving route,
    receiving the control command with the electronic actuator, and
    changing an open state of the door with the electronic actuator,
    wherein the controller automatically generates the control command once the detector detects that the moving route of the vehicle involves the door,
    wherein the controller automatically opens beforehand the door through which the moving route of the vehicle leads, so that the movement of the vehicle is not delayed because the vehicle must wait for the door leaf to swivel, and
    wherein the controller accesses an area map, identifies therein all the doors located on the moving route and transmits a control command for activating the actuator to each of the doors before the movement along the moving route starts.

9. The method according to claim 8, wherein a calculator of the vehicle generates an area map based on the detected object data, and wherein information about a spatial position of a door within the environment is stored in the area map or in a file linked with the area map.

* * * * *